J. H. DOWNING.
HARVESTER TRUCK.
APPLICATION FILED MAY 10, 1911.
1,029,534.
Patented June 11, 1912.
2 SHEETS—SHEET 1.
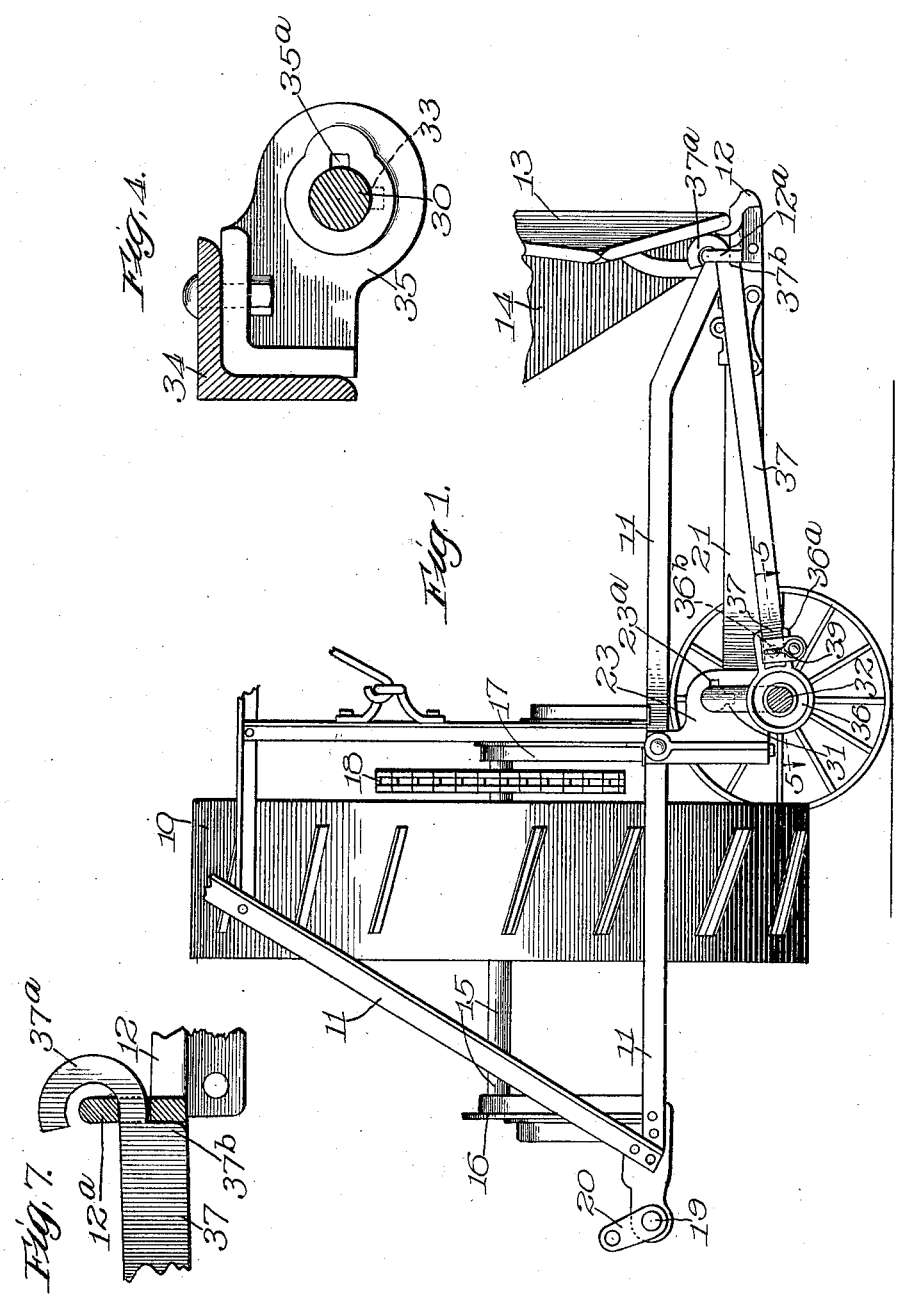
Witnesses:
Inventor.
John H. Downing
By Brown & Hopkins
Attys.

J. H. DOWNING.
HARVESTER TRUCK.
APPLICATION FILED MAY 10, 1911.
1,029,534.
Patented June 11, 1912.
2 SHEETS—SHEET 2.
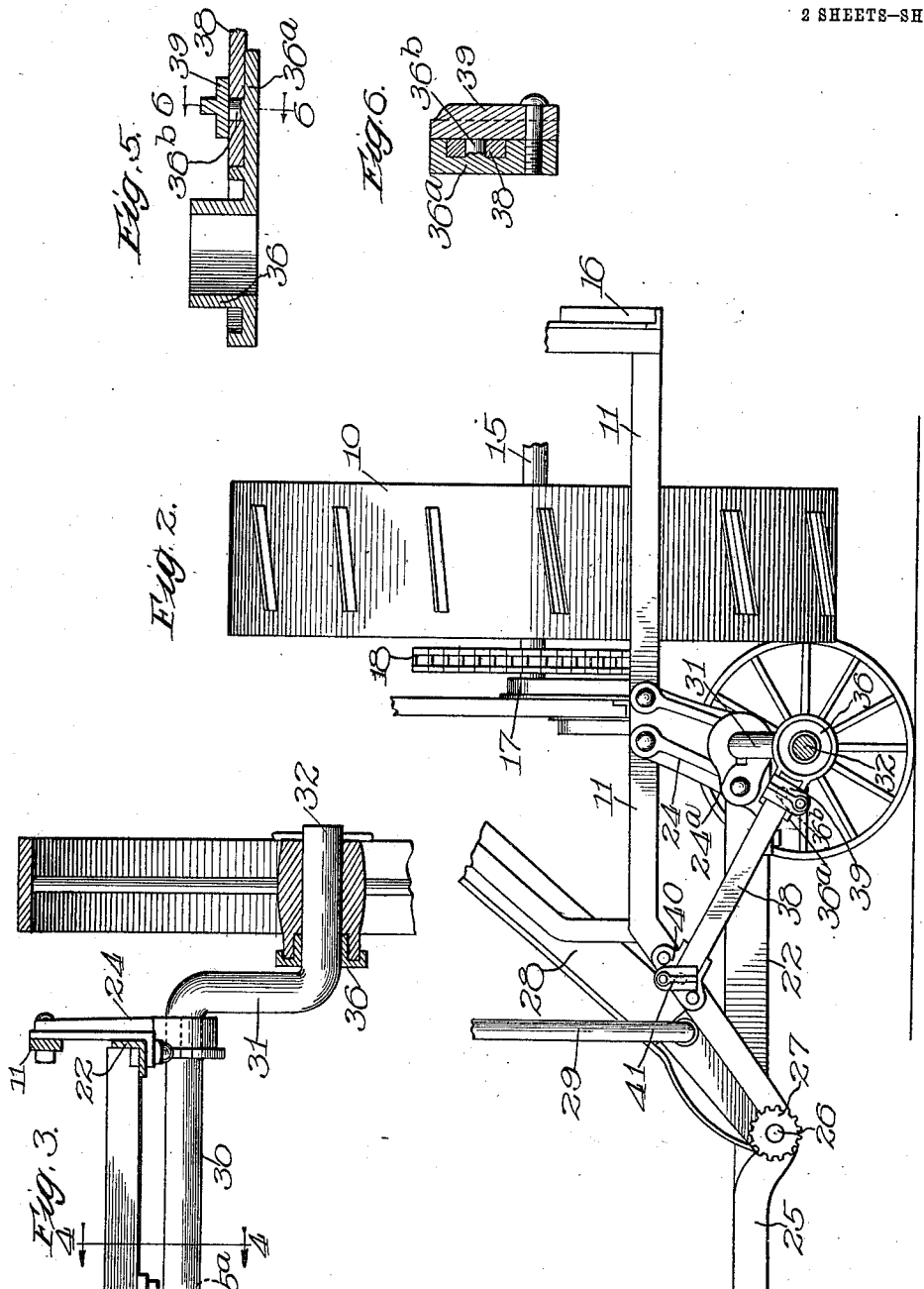

UNITED STATES PATENT OFFICE.

JOHN H. DOWNING, OF STILLWATER, MINNESOTA, ASSIGNOR TO THE STATE OF MINNESOTA.

HARVESTER-TRUCK.

1,029,534.  Specification of Letters Patent.   Patented June 11, 1912.

Application filed May 10, 1911. Serial No. 626,393.

*To all whom it may concern:*

Be it known that I, JOHN H. DOWNING, a subject of the King of England, residing at Stillwater, in the county of Washington and State of Minnesota, have invented certain new and useful Improvements in Harvester-Trucks, of which the following is a specification.

The invention relates to trucks adapted to be used on harvesters or other agricultural machines which, owing to their excessive width, have to be drawn endwise along roads or through gates or other openings, and the object of the invention is to provide an improved truck with means for the temporary attachment of the same to the machines by which they may be drawn from one place of use to another.

The invention further relates to harvester trucks of the divided axle or stub axle type, and a further object is to provide improved means for quickly attaching and detaching such stub axles to the frames of the machines without the employment of special devices or tools for securing them in place.

To the attainment of these ends and to accomplish certain other new and useful objects, the invention consists in the feature of novelty hereinafter described, shown in the drawings forming a part of the specification, and pointed out more specifically in the claims.

In the said drawings, Figure 1 is a front view of a portion of the main frame of a harvester with my improved trucks applied thereto and in position for transporting the harvester, the truck wheel at the front side of the machine being removed, with the front axle in section to disclose the details of construction of the parts used for temporarily attaching the axle to the harvester main frame. Fig. 2 is a similar view taken at the rear of the harvester main frame. Fig. 3 is a sectional view through a portion of the main frame of the harvester adjacent one of the truck axles and showing the details of construction by which such axle is temporarily attached to the harvester main frame, parts of such main frame, together with the truck wheel, being in section. Fig. 4 is a sectional view on line 4—4, of Fig. 3, looking in the direction indicated by the arrows. Fig. 5 is an enlarged sectional detail view on line 5—5, of Fig. 1, looking in the direction indicated by the arrows. Fig. 6 is a sectional detail view on line 6—6, of Fig. 5, looking in the direction indicated by the arrows. Fig. 7 is an enlarged broken detail view of a portion of the inside shoe of the harvester and broken portion of the end of one of the truck axle supports on a part of the shoe formed especially for such purpose, which part is in section in this view.

The master wheel or main wheel of the harvester shown is indicated by the reference character 10, Figs. 1 and 2, and so much of the main frame of a harvester is shown only as is necessary to illustrate the details of the structure necessary to coöperate with my improved harvester trucks and to show their mode of attachment to and manner of operation in connection with the machine, such harvester main frame being indicated by the reference character 11.

12 is the inside shoe secured as usual at the inside end of the cutter bar not herein shown, and 13 is the inside divider.

A portion of the usual front elevator frame is shown at 14, while 15 designates the axle of the master wheel or main wheel, and 16, 17, the usual segment brackets secured to the harvester main frame for adjustably seating the ends of the main wheel axle in order to permit the main frame to be raised and lowered in relation to the main wheel. Any of the well known mechanism for raising and lowering the machine on the main wheel may be employed and none is herein shown, as the same forms no part of the invention. For the purpose of illustrating the adaptation of the invention to the harvester main frame, a few of the other details of the machine are shown, usually with parts broken away, as for example, the main driving sprocket on the main wheel axle as indicated by the reference character 18, crank shaft 19 and the crank 20 for driving the cutting mechanism, and the front and rear bars of the platform frame as indicated by the reference characters 21 and 22, in Figs. 1 and 2 respectively, which bars are extended beyond the inside limits of the platform to points adjacent the main wheel where they are secured relative to the main frame 11 by suitable brackets, usually castings of special design which will be hereinafter more fully described, the reference character 23 indicating the bracket at the front of the machine, while 24 is the bracket at the rear. In the rear view of the machine frame in Fig. 2, a portion of the rear harvester platform is shown as indicated at 25, and 26 and 27 designate the inside roller gudgeon for driving the platform canvas and the sprocket wheel for operating the same.

28 indicates a broken portion of the harvester elevator at the rear and the narrow construction of the same, together with the broken portion of the gooseneck brace 29, would indicate that the machine to which the invention is applied is of the open end type although it will be apparent that the invention may as readily be applied to harvesters of other designs and types with perhaps slight modifications in the proportions of parts to adapt them to a harvester frame of such design.

Harvester trucks for transporting machines in the manner already described are usually furnished as attachments and it is desirable to make such attachments of the most economical construction possible. One of the greatest items of expense in equipping a harvester with transport trucks is in the cost of constructing metallic wheels sufficiently strong to carry the weight of the machine. To enable the use of as small and consequently as cheap a wheel as possible, it is preferred that the truck axles be cranked as shown most clearly in Fig. 3, such axles being formed preferably of round stock usually of solid metal, as steel, and in order to save the expense of machining and forging, it is preferred that the entire axle shall be of stock of uniform diameter, or approximately so, such diameter being preferably of a size suitable to form a spindle or axle for the truck wheel without any machining or forging, as it is found that stock of sufficiently uniform character for this purpose may be secured directly from the rolling mills. The cranked form of the axle which is preferred is best illustrated in Fig. 3, and from an inspection of which it will be seen that the body portion of the axle which extends beneath and is secured to the main frame of the harvester is the longest single member of the axle and that the material is formed at an approximately right angle to this body portion for a distance usually of several inches and is thence extended at a right angle to the bent portion in order that the spindle adapted to enter the hub of the truck wheel shall be approximately parallel with the body portion of the axle extending beneath the main frame to bring the truck wheels to the proper vertical position. The body portion of the truck axle is indicated by the reference character 30, the angularly deflected portion at 31 and the wheel spindle at 32. It is preferred that the brackets 23, 24, heretofore referred to be utilized for supporting in part the truck axles. This is accomplished by strengthening these parts somewhat as illustrated particularly by the part 24 in Fig. 2 by thickening the casting in order to add extra material around a perforation formed in the casting of proper diameter to support the body portions of the crank axles. Near the extreme inner ends of the body portions 30 of the cranked axles, each have formed thereon or rigidly connected thereto, lugs as indicated at 33. The perforated brackets 23, 24, secured by the main frame 11 and to the inner extremities of the front and rear bars of the platform, are connected by a suitable bar usually of angle iron as indicated at 34 to serve as a means for supporting the inner ends of the body portions of the truck axles which extend beneath the main frame of the harvester. Suitable bearing castings are provided as indicated by the reference character 35 the same being secured to a suitable or convenient part of the harvester main frame.

In the present embodiment of the invention the castings 35 for supporting the axles at their inner ends are shown secured to the connecting bars 34 of the main frame which are convenient for this purpose. The castings 35, which provide the supports for the inner ends of the axles and the perforated brackets 23, 24, which support the same near their cranked portions adjacent the truck wheels, are each provided with slots communicating with the perforations or openings adapted to take the body portions of the axles. These slots, indicated by the reference characters 35$^a$ in the part 35, 23$^a$ in the part 23, and 24$^a$ in the part 24, are of a size sufficient to permit the fixed lugs or pins 33 on the inner ends of the body portions 30 of the axles to pass through the slots when the pins or lugs are in register with them but it will be apparent that the body portions 30 of the axles can not on account of lugs or pins 33, pass through the supporting members until the axle is turned to the position where these pins and slots register. It is preferred that the slots 23$^a$ and 24$^a$ be formed at the sides of the openings in the axle supporting brackets and that pins or lugs 33 be formed when the axle is in working position, as illustrated in Fig. 3, on the main frame so that pins or lugs 33 will be at an angle of about 90° to the slots. Strict observance to this detail of construction, however, is not necessary, for it will be apparent that the function of pins or lugs 33 and coöperating slots on the axle supporting brackets are for the purpose of locking the cranked axles in working position within the brackets and this purpose will be accomplished if the slots in the brackets and the pins or lugs on the axles are out of register to any considerable extent when the axle is in normal working position. It is, of course, desirable that means be provided for preventing the cranked axles from rotating on the main body portions 30 during the normal operation of the truck to prevent the axles from becoming disengaged. When cranked axles of the type herein shown are employed, it is also desirable that they be well supported in relation to the harvester main frame, to prevent the rotation of the cranked axles, while the machine is being carried on the transport trucks, which would result in the harvester main frame being dropped and would also result in suddenly bringing the main wheel or the master wheel of the harvester in contact with the ground or other obstruction and would probably cause considerable damage to either wheel, or frame and connecting parts, or all of them.
This result has sometimes been accomplished by forming angular holes in the castings on the main frame which support the cranked axles and at the same time forging the axles themselves into angular shape to coöperate with such angular perforations in the supporting brackets. In order to supply axles of material of proper character and sufficient strength to support the weight of a harvester on transport truck wheels such axles are formed of steel or other similar metal which necessitates much labor and expense in forging or machining the axle into the proper form when they must be formed angular. The spindle must be round to accommodate the truck wheel. If the stock be square the spindle must be machined, while if the stock be round, the body portion of the axle must be forged into the required angular shape. Therefore for economy in manufacture it is desirable to avoid axles, the body portions of which are angular in cross section. My improved axle as constructed requires no forging on this account after it is given its cranked form. When the axles are inserted into their supporting brackets on the main frame they may be secured against rotation therein and the cranked portions including the spindles for supporting the truck wheels securely held in their lowermost adjusted positions by means which may be adjusted to lock them in position without the use of special devices as wrenches and the like, which improved means will now be described.

Suitable collars 36 are provided with openings by which they may be sleeved over the spindles 32 of the axles to be seated against the angular portions of the axles adjacent the inner ends of the spindles. These collars are preferably provided at their inner extremities with flanges which may be grooved to form seats and means for protecting the inner ends of the wheel hubs from admitting dust and foreign particles to the interior of the hub bearings. To the periphery of each collar 36 is secured a radial extension as indicated at 36ª into one side of which is formed a depression adapted to furnish a seat for one end of a bar, as for example, the flat bars 37 and 38 which are used in the embodiment of the invention, as shown in the drawings, Figs. 1 and 2, for supporting the front and rear axles respectively. Connection is made between the bars and the collars in the following manner: The radial extension 36ª of the collar is provided with a lug 36ᵇ adapted to pass through perforations formed in the end of bars 37 and 38 and the end of each bar is locked in position on such retaining lug by latches 39 pivotally secured to one side of the radial portion 36ª of the collars 36. The flat bars 37, 38, are extended and secured to suitable fixed parts on the main frame of the harvester. The preferred manner of securing the bar 37 to the harvester main frame is illustrated in Figs. 1 and 7 from which it will be seen that the outer extremity of the flat bar 37 has a hooked portion 37ª formed on its extremity while adjacent the base of such hooked portion there is formed an offset or stop 37ᵇ. The inside shoe of the machine indicated by the reference character 12 has formed thereon preferably integral with it a perforated lug 12ª adapted to take the hooked portion 37ª of the bar 37 while the bar is prevented from further entering such perforation by reason of the stop 37ᵇ before referred to which engages the shoe adjacent the perforation. The attachment of the flat bar 38 which supports the rear crank axle to the main frame may be accomplished in the manner shown in Fig. 2. In this construction the outer end of the bar 38 is perforated as before, such perforation being adapted to pass over a lug formed on casting 40, bolted or otherwise secured to the main frame 11 and carrying a pivoted thumb latch as indicated at 41 for securing the parts together, similar to the construction already described for securing the opposite end of the bar 38 to the collar 36.

The operation of equipping the machine with trucks and removing the same therefrom after transportation is as follows: It is desirable to raise the main frame on the master wheel by the usual raising and lowering device not herein shown in detail. The truck axles with the wheels in position on the spindles may then be inserted in the supporting castings on the main frame, first by turning the body portions of the axles to a position where lugs or pins 33 at the inside ends of the axles will register with slots 23ª and 24ª in the supporting castings and also through similar slots 35ª in the inside castings 35, which will permit the portions 30 of the axles to be passed through the bearings until the pins or lugs 33 shall have passed through and beyond the inside castings 35. The axles will then be rotated until the truck wheels will be at their lowermost extremities in relation to the main frame, which will lock them in the supporting castings by bringing pins and lugs 33 out of register with the slots in the supporting castings. The flat locking bar 37 as well as the flat locking bar 38 will then be disengaged and the bar 37 will be brought to a position where the hooked portion 37ᵃ may be caused to enter the perforation in the projection 12ᵃ on the inside shoe, after which the bar will be rocked to cause the hooked portion to further enter the perforation and until the offset portion or stop 37ᵇ shall engage the projection on the shoe adjacent the perforation which will bring the free end of the bar in the proper position to engage over the lug 36ᵇ on the radial extension 36ᵃ of the inside collars and on the axle spindles. When the bar 37 is brought to this last position it will be securely locked in relation to the inside shoe and will then be locked to the collar 36 by the pivoted thumb latch 39.

The rear cranked axle is inserted in the supporting castings 24, 35, in a manner similar to the front axle just described after which the free end of the bar 38 supporting the rear cranked axle is secured within the locking member comprising the casting 40, the fixed pin on this casting passing through the perforation at the outer end of the bar and the parts being locked together by the pivoted thumb latch 41. When both front and rear truck axles are thus secured in position beneath the machine frame, the machine frame is lowered on the master wheel 10 by the raising and lowering mechanism until the truck wheels rest upon the ground. The raising and lowering device is then usually operated to the limit of its movement to raise the master wheel as high as possible in relation to the frame in order to enable it to clear obstructions on roads or in fields and the machine is then in position for the machine to be transported endwise by hitching in the usual manner to the outer end of the harvester platform or at the other side of the machine frame, if desired, although the usual and preferred form of hitch is at the outer or grainward end of the harvester platform, such hitch not being shown or described since it forms no part of the invention.

In this specification the preferred form of the invention has been shown and described but it is not desired to be limited to the exact details of construction for it will be apparent that persons skilled in the art may vary such details without departing from the invention.

What I claim as new is:—

1. The combination with the frame of a harvester, of an attachable and detachable axle for a truck wheel comprising a body portion adapted for securement to the harvester frame and a wheel spindle, said body portion of the axle being cylindrical in form and of approximately uniform diameter throughout, and provided with a fixed lug or pin near its inner extremity and a plurality of separated and perforated bearing castings or brackets on the main frame adapted to rotatably support said body portion of the axle, said separated castings or brackets being provided with slots opening into the perforations therein, adapted to register with the said lug or pin on the axle body when the axle is rotated to an inoperative position to permit the insertion of the axle body.

2. The combination with the frame of a harvester, of an attachable and detachable axle for a truck wheel comprising a body portion adapted for securement to the harvester frame and a wheel spindle, said body portion of the axle being cylindrical in form and of approximately uniform diameter throughout, and provided with a fixed lug or pin near its inner extremity, a plurality of separated and perforated bearing castings or brackets on the main frame adapted to rotatably support said body portion of the axle, said separated castings or brackets being provided with slots opening into the perforations therein, adapted to register with the said lug or pin on the axle body when the axle is rotated to an inoperative position to permit the insertion of the axle body, and means for locking the axle against rotation to prevent withdrawal of same from the bearing castings or brackets.

3. The combination with the frame of a harvester, of an attachable and detachable axle for a truck wheel comprising a body portion adapted for securement to the harvester frame and a wheel spindle, said axle being cranked whereby the spindle and the body portion lie in different planes, said axle formed of an integral cylindrical bar of approximately uniform diameter throughout and being provided with a fixed lug or pin on the body portion, a plurality of separated and perforated bearing castings or brackets on the main frame adapted to rotatably support said body portion of the axle, one of said separated castings or brackets being provided with a slot opening into the perforation therein adapted to register with the said lug or pin on the axle body when the axle is rotated to an inoperative position to permit the insertion of the axle body, and means for locking the axle against rotation on the cylindrical body portion comprising a bar secured, at one end to the axle adjacent the cranked wheel spindle, and at its other end to the frame of the harvester.

4. The combination with the frame of a harvester, of an attachable and detachable axle for a truck wheel comprising a body portion adapted for securement to the harvester frame and a wheel spindle, said axle being cranked whereby the spindle and the body portion lie in different planes, said axle being formed of an integral cylindrical bar of approximately uniform diameter throughout and being provided with a fixed lug or pin on the body portion, a plurality of separated and perforated bearing castings or brackets on the main frame adapted to rotatably support said body portion of the axle, one of said separated castings or brackets being provided with a slot opening into the perforation therein adapted to register with the said lug or pin on the axle body when the axle is rotated to an inoperative position to permit the insertion of the axle body, and means for locking the axle against rotation to prevent withdrawal of same from the bearing castings or brackets comprising a bar detachably connected at one end to the axle and at its other end to the harvester frame.

5. The combination with a frame of a harvester, of an attachable and detachable axle for a truck wheel comprising a body portion adapted for securement to the harvester frame, a wheel spindle lying out of the plane of the body portion and a cranked portion connecting said body portion and spindle, the said body portion of the axle being cylindrical in form and of approximately uniform diameter throughout and provided with a fixed lug or pin near its inner extremity and a plurality of separated and perforated bearing castings or brackets on the main frame adapted to rotatably support said body portion of the axle, said separated castings or brackets being provided with slots opening into the perforations therein adapted to register with the said lug or pin on the axle body when the axle is rotated to an inoperative position to permit the insertion of the axle body and means for detachably connecting the cranked portion of the axle adjacent the wheel spindle thereof to the harvester frame to prevent withdrawal of the same from the bearing castings or brackets.

6. The combination with the frame of a harvester, of an attachable and detachable axle for a truck wheel comprising a body portion and a cranked spindle formed integral therewith, said body portion of the axle being provided with a fixed lug or pin, a plurality of separated and perforated bearing castings or brackets on the main frame adapted to rotatably support the body portion of the axle, one of said separated castings or brackets being provided with a slot opening into the perforations adapted to register with the said lug or pin on the axle body and means for securing the axle to the main frame to prevent rotation of the body portion in its bearings comprising a bar provided with perforations adjacent its extremities, castings secured to the harvester frame and to the spindle of the axle, there being slots in the said castings adapted to receive the ends of the bar, lugs on the castings adapted to register with the said perforations at the ends of the bar, and pivoted locking members for securing the ends of the bar to the said castings.

7. The combination with the frame of a harvester, of an attachable and detachable axle for a truck wheel comprising a body portion adapted for securement to the harvester frame, a wheel spindle, a cranked portion connecting said body portion and spindle, said body portion, cranked portion and spindle being formed of an integral cylindrical bar of metal and of approximately uniform diameter throughout there being a fixed lug or pin on the body portion of the axle, a plurality of separated and perforated bearing castings or brackets on the main frame adapted to rotatably support the body portion of the axle, one of said separated castings or brackets being provided with a slot opening into the perforations therein whereby the body portion of the axle may be inserted in the bearing by passing the said lug or pin through the slot, and means for securing the said body portion of the axle against rotation in the said bearing castings or brackets to prevent withdrawal of the same therefrom.

8. The combination with the frame of a harvester, of an attachable and detachable axle for a truck wheel comprising a body portion adapted for securement to the harvester frame, a wheel spindle, an angular portion connecting said body portion and wheel spindle, said axle comprising the body portion, the angular portion and the wheel spindle being formed of an approximately cylindrical metallic bar provided with a fixed lug or pin on the body portion, a plurality of separated and perforated bearing castings or brackets on the main frame adapted to rotatably support said body portion of the axle and at least one of said brackets or castings being provided with a slot opening into the perforation therein adapted to register with the said lug or pin on the body portion, when the axle is rotated to an inoperative position to permit the insertion of the axle body therein, and means for locking the axle against rotation on the body portion thereof to prevent withdrawal of same from the bearing castings or brackets, said last mentioned means comprising a bar detachably connected at one end to the harvester frame and being secured at its other extremity to the axle adjacent the wheel spindle and remote from the body portion of the axle.

9. The combination with the frame of a harvester, of an attachable and detachable axle for a truck wheel comprising a body portion adapted for securement to the harvester frame, a wheel spindle, an angular portion connecting said body portion and wheel spindle, said axle, comprising the body portion, the angular portion and the wheel spindle being formed of an approximately cylindrical metallic bar provided with a fixed lug or pin on the body portion, a plurality of separated and perforated bearing castings or brackets on the main frame adapted to rotatably support said body portion of the axle and at least one of said brackets or castings being provided with a slot opening into the perforation therein adapted to register with the said lug or pin on the axle body when the axle is rotated to an inoperative position to permit the insertion of the axle body therein, and means for locking the axle against rotation on the body portion thereof to prevent withdrawal of same from the bearing castings or brackets, said last mentioned means comprising a casting sleeved on the axle spindle, a bar detachably connected at one end to the harvester frame and being detachably secured at its other end to the casting sleeved on the axle spindle.

10. The combination with the frame of a harvester, of an attachable and detachable axle for a truck wheel comprising a body portion adapted for securement to the harvester frame and a wheel spindle, said body portion of the axle being cylindrical in form and of approximately uniform diameter throughout, a plurality of separated and perforated bearing castings or brackets on the main frame adapted to support said body portion of the axle, a lug or pin fixed to the body portion of the axle, there being slots opening into the perforations in said bearing castings or brackets adapted to permit the insertion of the cylindrical body portion of the axle, and means for securing the axle to the main frame to prevent the rotation relative to the said bearing castings or brackets and to prevent the disengagement of the axle from the harvester frame.

11. The combination with the frame of a harvester, of an attachable and detachable axle for a truck wheel comprising a body portion and a cranked spindle of separated and perforated bearing castings or brackets on the frame adapted to rotatably support the body portion of the axle, means for securing the body portion of the axle against longitudinal movement in the supports therefor, and means for securing the said axle against rotation comprising a bar detachably secured to the harvester main frame and being secured to the bearing portion of the cranked spindle of the axle.

In testimony whereof I have signed my name to this specification, in the presence of two subscribing witnesses, on this 6th day of May A. D. 1911.

JOHN H. DOWNING.

Witnesses:
H. W. DAVIS,
S. D. PORTER.

Copies of this patent may be obtained for five cents each, by addressing the "Commissioner of Patents, Washington, D. C."